United States Patent
Kim et al.

(10) Patent No.: US 8,595,226 B2
(45) Date of Patent: Nov. 26, 2013

(54) METHOD AND SYSTEM FOR PROVIDING CONTENT ACCORDING TO PERSONAL PREFERENCE

(75) Inventors: Jin Soo Kim, Seoul (KR); Daniel Jim Roh, Seoul (KR); Ho Yun Lee, Seongnam (KR)

(73) Assignee: Yahoo! Inc., Sunnyvale, CA (US)

( * ) Notice: Subject to any disclaimer, the term of this patent is extended or adjusted under 35 U.S.C. 154(b) by 1393 days.

(21) Appl. No.: 11/873,692

(22) Filed: Oct. 17, 2007

(65) Prior Publication Data
US 2009/0043781 A1 Feb. 12, 2009

(30) Foreign Application Priority Data
Aug. 10, 2007 (KR) .......................... 10-2007-0080529

(51) Int. Cl.
*G06F 7/00* (2006.01)
*G06F 17/30* (2006.01)

(52) U.S. Cl.
USPC .......................... 707/731; 707/732; 707/740

(58) Field of Classification Search
USPC ..................... 707/3, 4, 5, 722–780
See application file for complete search history.

(56) References Cited

U.S. PATENT DOCUMENTS

| | | | |
|---|---|---|---|
| 5,727,129 A | 3/1998 | Barrett et al. | |
| 5,740,430 A | 4/1998 | Rosenberg et al. | |
| 5,754,939 A | 5/1998 | Herz et al. | |
| 5,787,417 A * | 7/1998 | Hargrove | 1/1 |
| 6,266,649 B1 | 7/2001 | Linden et al. | |
| 6,330,592 B1 | 12/2001 | Makuch et al. | |
| 6,385,619 B1 * | 5/2002 | Eichstaedt et al. | 1/1 |
| 6,606,619 B2 * | 8/2003 | Ortega et al. | 1/1 |
| 6,895,406 B2 * | 5/2005 | Fables et al. | 1/1 |
| 7,031,961 B2 * | 4/2006 | Pitkow et al. | 1/1 |
| 7,693,827 B2 * | 4/2010 | Zamir et al. | 707/999.003 |
| 2002/0123988 A1 * | 9/2002 | Dean et al. | 707/3 |
| 2005/0240580 A1 * | 10/2005 | Zamir et al. | 707/4 |
| 2006/0036581 A1 * | 2/2006 | Chakrabarti et al. | 707/3 |

FOREIGN PATENT DOCUMENTS

| | | |
|---|---|---|
| KR | 2004-0090402 | 10/2004 |
| KR | 1020040090402 A | 10/2004 |
| KR | 2007-0038146 | 4/2007 |
| WO | 2006-017364 | 2/2006 |
| WO | WO2006/012120 A2 | 2/2006 |
| WO | WO2006/017364 A1 | 2/2006 |

OTHER PUBLICATIONS

Makris et al. "Category ranking for personalized search", Jan. 4, 2006.*

(Continued)

*Primary Examiner* — Shew-Fen Lin
(74) *Attorney, Agent, or Firm* — Martine Penilla Group, LLP (57) ABSTRACT

In one embodiment of the present invention, a main server receives a content request identifying a content category from a client and identifies the client sending the request from the content request. Then, the content category from the content request is identified. The main server determines if the content category is included in a preference tag of the identified client. The preference tag comprises a plurality of hierarchical category identifiers selected from a hierarchical configuration of category identifiers. If the content category is included in the preference tag associated with the identified client, then personalized content according to the preference tag of the identified client is provided. Thus, a method and system for providing content according to personal preference are provided.

13 Claims, 8 Drawing Sheets

(56) References Cited

OTHER PUBLICATIONS

English Translation of the Korean Intellectual Property Office Notice of Last Preliminary Rejection for KR 10-2007-80529, Nov. 19, 2009.
KP 10-2007-80529 Results fo KIPO Examination—English Translation.
KP 10-2007-80529 Results fo KIPO Examination—in Korean.
Yan et al., From User Access Patterns to Dynamic Hypertext Linking (1996), Computer Networks and ISDN Systems, Issues 7-11 (May 1996),1007-1014.

* cited by examiner

| | content | category 1 | category 2 | category 3 |
|---|---|---|---|---|
| 361 | news on domestic baseball | sports | domestic | baseball |
| 362 | news on domestic baseball | sports | domestic | baseball |
| 363 | news on domestic baseball | sports | domestic | baseball |
| 364 | news on domestic soccer | sports | domestic | soccer |
| 365 | news on foreign sports | sports | foreign | |
| 366 | news on foreign baseball | sports | foreign | baseball |
| 367 | news on foreign baseball | sports | foreign | baseball |
| 368 | news on DVD movie | entertainment | movie | DVD |
| 369 | news on DVD movie | entertainment | movie | DVD |
| 370 | news on DVD movie | entertainment | movie | DVD |

(column headers 310, 320, 330, 340)

| client ID | preference tag 1 | preference score 1 | preference tag 1 | preference score 1 | ... | preference tag n | preference score n |

METHOD AND SYSTEM FOR PROVIDING CONTENT ACCORDING TO PERSONAL PREFERENCE

TECHNICAL FIELD

The present disclosure generally relates to providing personalized content to clients.

BACKGROUND

Since the proliferation of the Internet in the mid-90s, the information provided using the Internet has drastically evolved in terms of both quantity and quality. It is important to enable users to quickly and easily access target content.

In a conventional Internet content provider service, content objects are provided regardless of the user preference. Thus, the users must navigate through lists of content until they find content, in which they are interested.

SUMMARY

The present invention provides a method and system for providing content according to personal preference. In one embodiment of the present invention, a main server receives a content request identifying a content category from a client and identifies the client sending the request from the content request. Then, the content category from the content request is identified. The main server determines if the content category is included in a preference tag of the identified client. The preference tag comprises a plurality of hierarchical category identifiers selected from a hierarchical configuration of category identifiers. If the content category is included in the preference tag associated with the identified client, then the personalized content according to the preference tag of the identified client is provided.

DESCRIPTION OF EXAMPLE EMBODIMENT(S)

In this section, various embodiments of the present invention will be described in detail with reference to the accompanying drawings. It will be apparent, however, that these embodiments may be practiced without some or all of these specific details. In other instances, well-known process steps or elements have not been described in detail so as not to unnecessarily obscure the description or the present invention.

Figure 1:
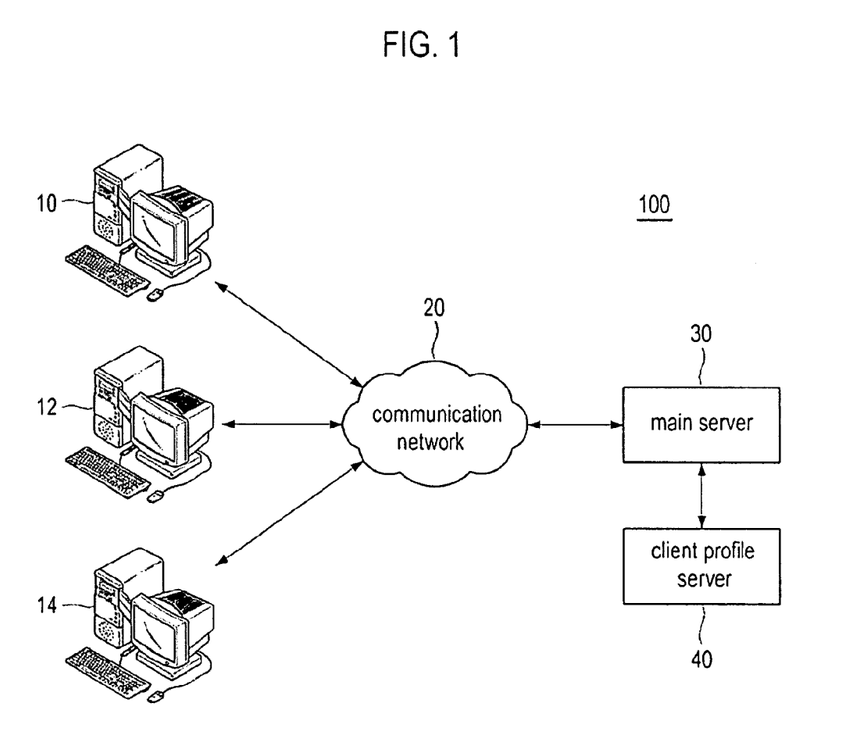
FIG. 1 illustrates a schematic diagram of a system for providing personalized content according to one embodiment of the present invention.

FIG. 1 illustrates a schematic diagram of a system for providing personalized content according to one embodiment of the present invention. In FIG. 1, a system 100 includes clients 10, 12, 14, a communication network 20 such as the Internet, a main server 30 and a client profile server 40. The main server 30 can set tags for content objects. The tag may comprise a plurality of hierarchical category identifiers selected from a hierarchical configuration of category identifiers, wherein the content object is associated with hierarchical identifiers. For example, a news content relating to a domestic baseball game can be classified with hierarchical category identifiers of "sports," "domestic" and "baseball." Thus, the tag for the news content can be hierarchically structured such as "sports>domestic>baseball."

Furthermore, the main server 30 may determine the frequency of client access to content objects having a tag and set the preference tags based on the frequency. The frequency is associated with a preference score. The tag having high preference scores can be set as the preference tag. The client profile server 40 may store preference tags and the corresponding preference scores for each client.

The client 10 may request the main server 30 to provide content that belongs to specific categories. Based on the request from the client 10, the main server 30 can identify a content category of the content that the client wishes to access. The main server 30 can determine if the content category is included in the preference tag of the client 10, the preference tag which is stored in the client profile server 40. If the content category is included in the preference tag, then the main server 30 can provide to the client 10 a list of personalized content objects that correspond to the preference tag. When the main server 30 provides content objects having the preference tag to the client, the amount of content objects to be provided can be controlled based on the preference score of the preference tag.

Figure 2:
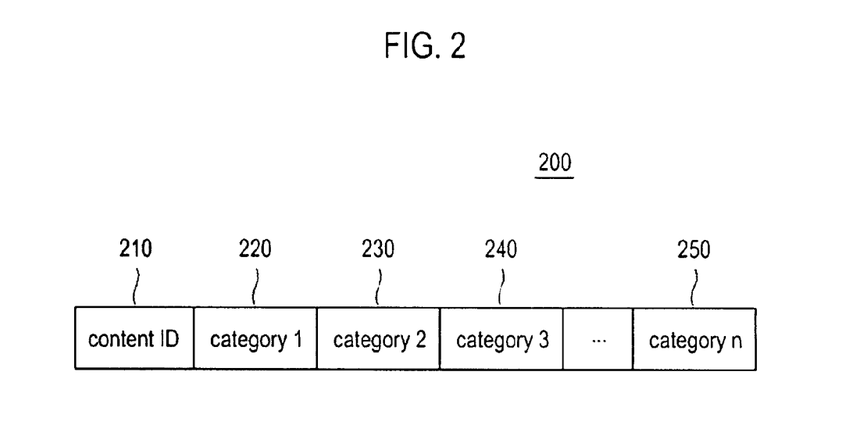
FIG. 2 illustrates a configuration of a tag according to one embodiment of the present invention.

FIG. 2 illustrates a configuration of a tag according to one embodiment of the present invention. The tag 200 that is set to the content includes a content ID 210 and categories 220-250 with which the content can be hierarchically classified. For example, the tag set to domestic baseball news can be classified with "sport" for category 1 (220), "domestic" for category 2 (230) and "baseball" for category 3 (240). A tag level can be defined as the number of categories that the tag includes. Thus, the tag level of "sport>domestic>baseball" is 3. The tag level of the tag, which is set to content, can be defined to represent the range of content with the tag.

The main server 30 can calculate the frequency of client access to content objects based on the history of the content objects. The main server 30 can also calculate the preference score of the tag based on the frequency. The main server 30 can choose the preference tags among the tags based on the magnitude of the preference scores.

Figure 3:
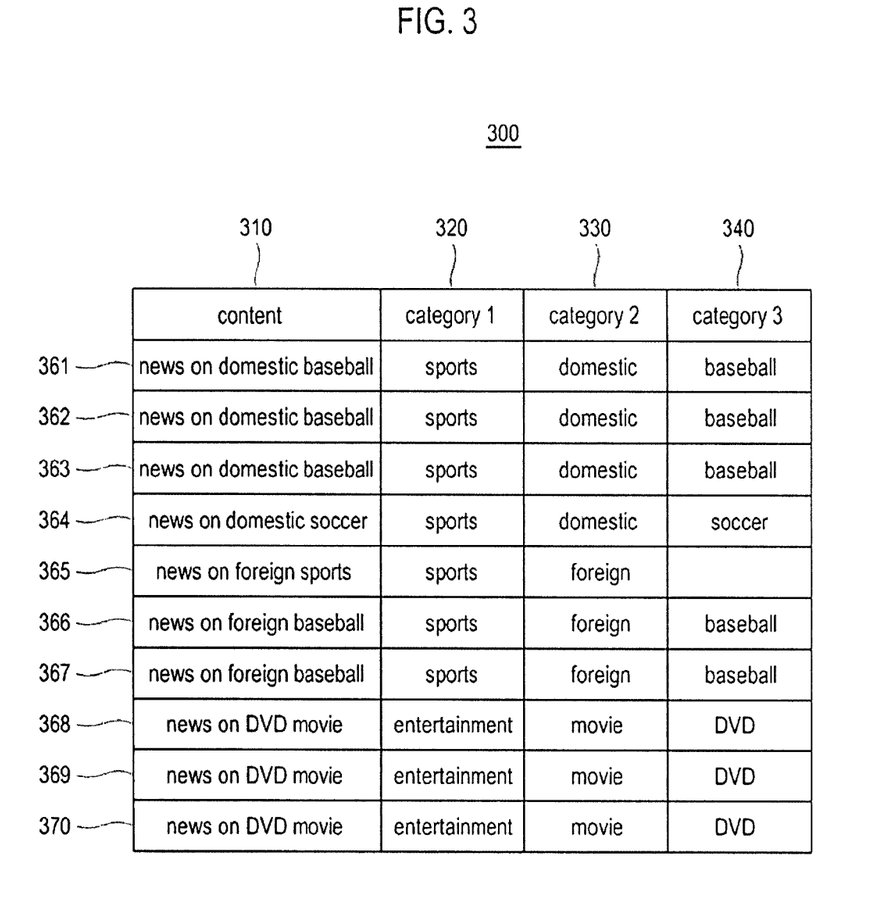
FIG. 3 illustrates an exemplary history of content accessed by a client and tags corresponding to said content.

FIG. 3 illustrates an example of history of content objects accessed by the client 10 and the tags to which the content objects belong. A history 300 includes hierarchical categories 320-340 to which content objects 361-370 can belong. Referring to the history 300, the client 10 most frequently accesses the content objects 361-363 related to domestic baseball (i.e., three times). Thus, the client may prefer to access other content objects with the tag "sport>domestic>baseball." In addition, the client 10 may also prefer to access content having tags configured to have categories "sport" or "domestic," which are upper level categories for the news tag, "sport>domestic>baseball." Thus, in order to quantify the user preference per client, the main server 30 may need to calculate the preference scores of tags including the upper level categories in the tags.

According to one embodiment of the present invention, the preference score of a tag can be calculated as the product of the frequency of accessing the contents objects having the tag and the weight value associated with the tag level of the tag. For example, the weight values for tag level 1, tag level 2 and tag level 3 can be 1, 2 and 5, respectively. The weight values can be adjusted according to the details of the embodiments of the present invention. Referring to the history 300, the preference score for the "sport>domestic>baseball" tag is 15 since it is accessed three times and the tag level of the tag is 3 as the tag includes three categories (i.e., "sport," "domestic" and "baseball"). Table 1 summarizes the preference scores of the tags of content objects that the client 10 has accessed (shown in FIG. 3) and the preference scores of tags to be configured with the upper level categories thereof.

TABLE 1

| Tag | Number | Weight value | Preference score |
|---|---|---|---|
| Sports | 7 | 1 | 7 |
| Sports > domestic | 4 | 2 | 8 |
| Sports > domestic > baseball | 3 | 5 | 15 |
| Sports > domestic > soccer | 1 | 5 | 5 |
| Sports > foreign | 3 | 2 | 6 |
| Sports > foreign > baseball | 2 | 5 | 10 |
| Entertainment | 3 | 1 | 3 |
| Entertainment > movie | 3 | 2 | 6 |
| Entertainment > movie > DVD | 3 | 5 | 15 |

Referring to Table 1, the client 10 prefers content relating to domestic baseball and DVD movies. Therefore, the main server 30 may set "Sports>domestic>baseball" and "Entertainment>movie>DVD" as preference tags. The main server 30 may then store them in the client profile server 40.

According to one embodiment of the present invention, the tag having a preference score within a specific range can be set as the preference tag. For example, if content objects with reference tags must have preference scores equal to or greater than 10, then the main server 30 can provide only content objects having the tags "Sports>domestic>baseball," "Sports>foreign>baseball" and "Entertainment>movie>DVD." The specific range of the preference scores can be assigned to each client differently.

According to one embodiment of the present invention, in order to make the preference score of the tag set to recently accessed content to be greater, the preference score of the tag on the nth day is represented by the following equation:

$$\sum_{e}\sum_{i} d(i) \times DailySum(n-i, e) \times cw(e) \qquad (1)$$

wherein DailySum(n−i, e) is the daily score function for an event e (e.g., click, mouse over, etc.) to represent the number of times content objects with the tag are accessed by the client on the (n−i)th day, d(i) is a decay function and the cw(e) is a category weight function as a function of the event, e. As i increases, d(i) decreases so that the influence of the daily score function value decreases to the preference score. cw(e) makes the effect of the daily score value different according to the event, i.e., the way to access the content and/or the tag level. For example, the increase in the preference score of a mouse click on the content is greater than that of a mouse over. Furthermore, as the tag level increases, the category weight function, cw(e), can make the effect of the daily score value to be greater as described above. According to one embodiment of the present invention, if there is a client for which the client profile server 40 does not store a preference tag, then the client can be provided with content based on other clients' preference tags by using collaborative filtering. For example, if the client for which the preference tags are not set requests content belonging to the "Sports" category, then the main server 30 can provide content to the client based on preference tags and corresponding preference scores of other clients that have accessed content in the "Sports" category.

Figure 4:
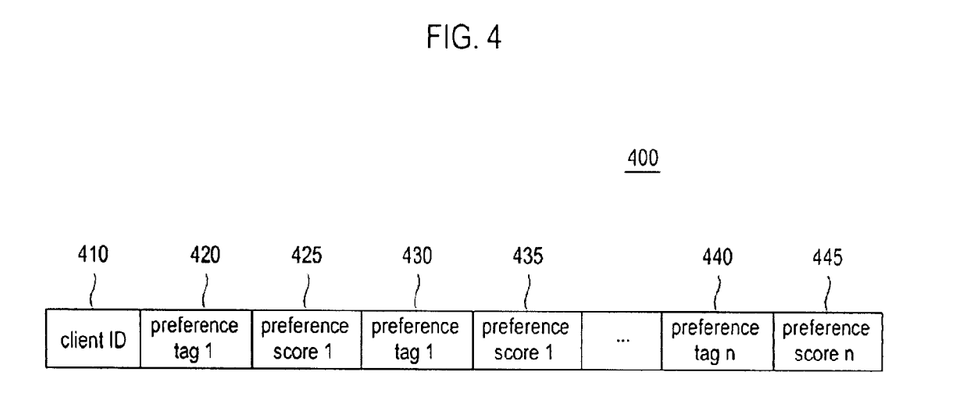
FIG. 4 illustrates an example of preference tags and preference scores that are stored in a client profile server according to one embodiment of the present invention.

FIG. 4 illustrates an example of preference tags aid preference scores that are stored in a client profile server according to one embodiment of the present invention. The client profile server 40 can store a preference profile 400 that includes a client ID 410, corresponding preference tags 420, 430, 440 and corresponding preference scores 425, 435, 445.

Figure 5:
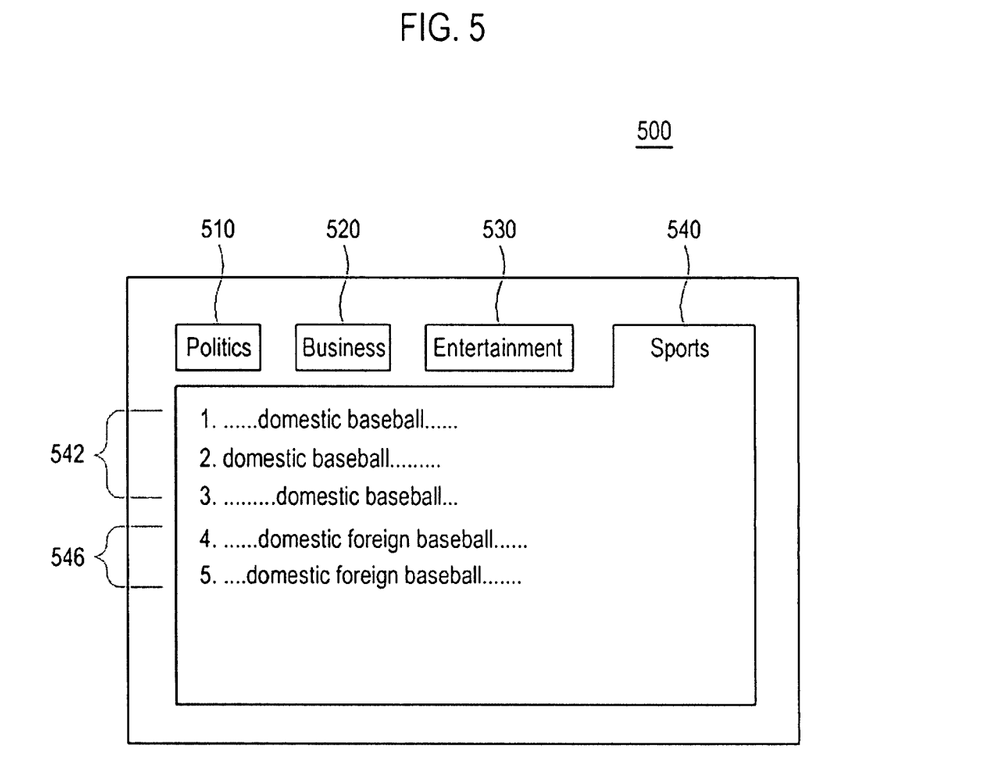
FIG. 5 illustrates an example of all interface according to one embodiment of the present invention.

FIG. 5 illustrates an example of an interface relating to the scenario in which the main server 30 provides a list of content objects with preference tags including the "Sports" category identifier when the client selects the "Sports" category. When a user who uses the client 10 clicks on the "Sports" tab 540 from a number of tabs 510-540, a request for a category of content may be transmitted to the main server 30. Then, the main server 30 can determine if there is at least one preference tag including the "Sports" category identifier in preference tags for the client 10 stored in the client profile server 40. If the client profile server 40 stores "Sports>domestic>baseball", "Sports>foreign>baseball" and "Entertainment>movie>DVD" as the preference tags for the client 10 with the preference scores, 15, 10 and 15, respectively, as shown in Table 1, then the main server 30 can determine that the content objects with "Sports>domestic>baseball" and "Sports>foreign>baseball" tags should be returned to the client 10. Then, the main server 30 can search content objects with the two preference tags and control the amount of content objects with the preference tags based on the corresponding preference scores i.e. 15 and 10. The main server 30 can provide a list of content objects with the controlled amount. Referring to Table 1, the main server 30 can provide content objects 542, 546 with "Sports>domestic>baseball" tag and "Sports>foreign>baseball" tag by a ratio of preference scores, i.e., 15 to 10. In this embodiment, there is provided the number of preference tags for providing content to the client is 2. However, it should be noted that the present invention is not limited to said number.

Content objects with the same preference tag can be ordered and provided to the client based on the release time of the content objects.

According to other embodiments of the present invention, content objects with only preference tags of a specific tag level can be provided, wherein the preference tags include categories that the client requests. Referring to Table 1, if content objects with only preference tags of tag level 2 are set to be provided to the client, then content objects with the "Sports>domestic" tag and the "Sports>foreign" tag can be provided to the client by a ratio of preference scores, i.e., 8 to 6.

Figure 6:
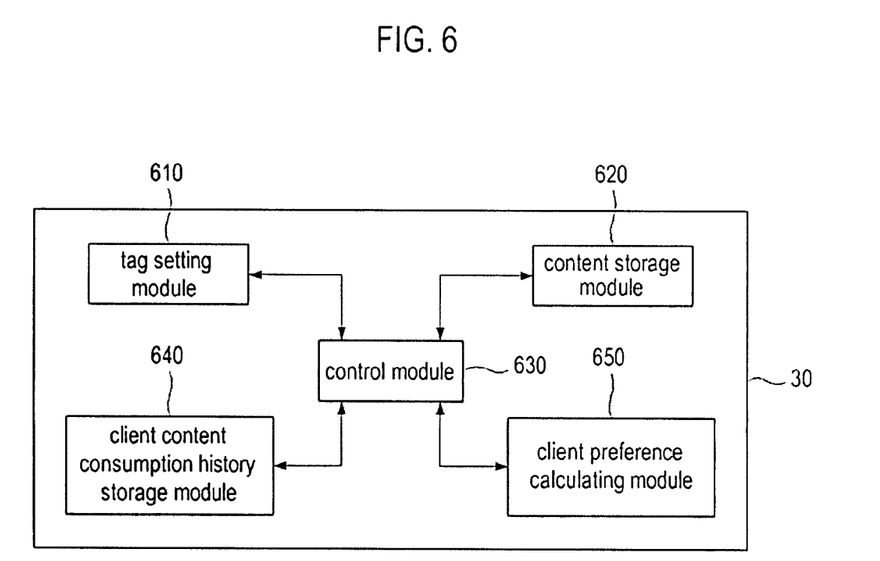
FIG. 6 illustrates a block diagram of a main server according to one embodiment of the present invention.

FIG. 6 illustrates a, block diagram of the main server according to one embodiment of the present invention. The main server 30 includes a tag setting module 610, a content storage module 620, a control module 630, a client content consumption history storage module 640 and a client preference calculating module 650.

The tag setting module 610 can set tags to content objects.

When the client requests content objects belonging to a category (e.g., "Sports") to the main server 30, the control module 630 can determine if there is at least one preference tag stored in the client profile server that includes the category. If there is a preference tag including the category then the control module 630 can search content objects with the preference tag(s) in the content storage module 620 to provide to the client. The control module 630 may also select some preference tags from all the preference tags with the category and provide content objects with the selected preference tags in accordance with rules such as preference scores, tag levels, etc.

The client content consumption history storage module 640 can store content consumption history of each client, wherein the stored information comprises client identification information, content identification information, time information, etc. This information can be used to set and update the preference tags of the client.

The client preference calculating module 650 can calculate the client profile including preference tags and preference scores for the client by using the history of the client stored in the client content consumption history storage module 640 and store the client profile to the client profile server 40.

Figure 7A:
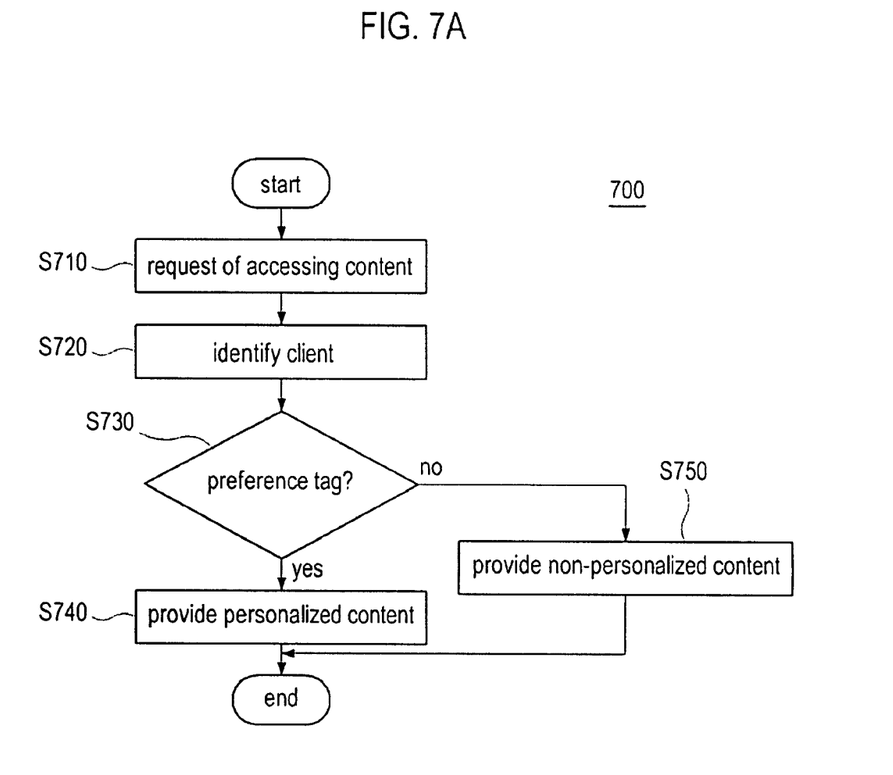
FIG. 7A illustrates a flow chart illustrating an example method for providing content to the client by the server according to one embodiment of the present invention.
Figure 7B:
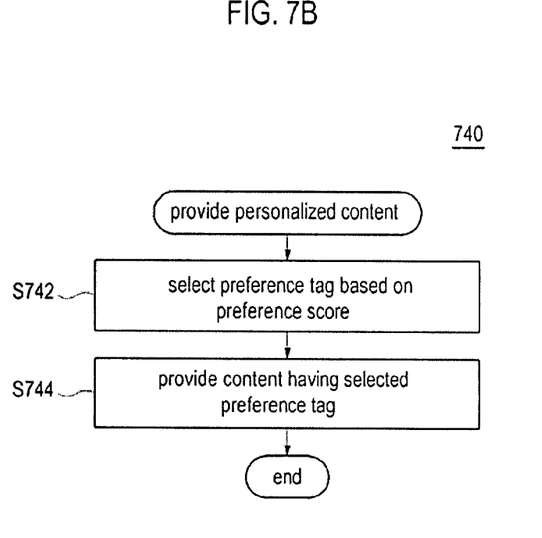
FIG. 7B illustrates a flow chart showing an example method for providing personalized content according to one embodiment of the present invention.

FIG. 7A illustrates a flow chart illustrating an example method for providing content to the client by the server according to one embodiment of the present invention. FIG. 7B illustrates a flow chart showing an example of method for providing personalized content according to one embodiment of the present invention.

In step S710, the client sends a content request identifying a content category, which is the class of content that the client prefers to access, to the main server 30. The main server 30 can identify the client using a browser ID, an internet address, etc. (S720). The control module 630 in the main server 30 can determine if there is at least one preference tag stored in the client profile server 40 that includes the content category (S730). The control module 630 can provide personalized content if there are such preference tags (S740). If there are no such preference tags, then the control module 630 can provide non-personalized content (S750).

Referring to FIG. 7B, in the step of providing personalized content (S740), the control module 630 can receive all or some of the preference tags corresponding to the category that the client requests (S742). Then, the control module 630 can search in the content storage module 620 and provide content objects having the received preference tags to the client (S744). The client content consumption history storage module 640 can update the content consumption history using content objects that are recently requested by the client or are sent by the main server 30.

In this embodiment, although personalized news is provided to the client, the embodiments of the invention should not be limited to news content. According to one embodiment of the present invention, the content may include search results, blogs, etc.

Figure 8:
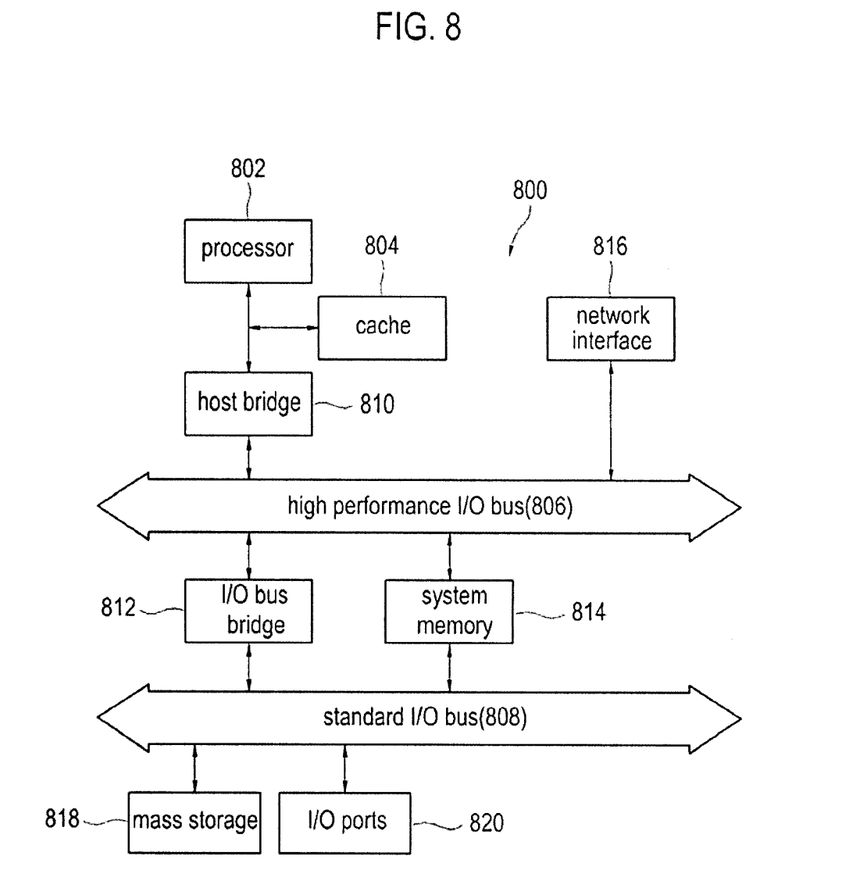
FIG. 8 illustrates an example of a computing system architecture, which may be used to implement the embodiments of the present invention.

While the methods and systems of the present invention have been described above with reference to specific embodiments, some or all of the elements or operations thereof may be implemented by using a computer system having general purpose hardware architecture. FIG. 8 illustrates an example of such computing system architecture, which may be used to implement the above described embodiments and which may be used to perform one or more of the processes or elements described herein. In one implementation, a hardware system 800 includes a processor 802, a cache memory 804 and one or more software applications and drivers directed to the functions described herein.

Additionally, the hardware system 800 includes a high performance input/output (I/O) bus 806 and a standard I/O bus 808. A host bridge 810 couples the processor 802 to the high performance I/O bus 806, whereas the I/O bus bridge 812 couples the two buses 806 and 808 to each other. A system memory 814 and a network/communication interface 816 couple to the bus 806. The hardware system 800 may further include a video memory (not shown) and a display device coupled to the video memory. A mass storage 818 and the I/O ports 820 are coupled to the bus 808. The hardware system 800 may optionally include a keyboard and pointing device, as well as a display device (not shown) coupled to the bus 808. Collectively, these elements are intended to represent a broad category of computer hardware systems including, but not limited to, general purpose computer systems based on the Pentium® processor manufactured by Intel Corporation of Santa Clara, Calif., as well as any other suitable processors.

The elements of the hardware system 800 are described in greater detail below. In particular, a network interface 816 provides communication between the hardware system 800 and any one of a wide range of networks such as an Ethernet (e.g., IEEE 802.3) network, etc. In case of the main server 30, the network interface 816 interfaces between the hardware system 800 and the network connected to the clients 10, 12, 14 and the client profile server 40 for allowing the hardware system 800 to communicate with those servers. Similarly, in case of the client profile server 40, the network interface 816 interfaces between the hardware system 800 and the network connected to the main server 30 and the clients 10, 12, 14 for allowing the hardware system 800 to communicate with those servers. The mass storage 818 provides permanent storage for the data and programming instructions to perform the above described functions implemented in the main server 30 or the client profile server 40 whereas the system memory 814 (e.g., DRAM) provides temporary storage for the data and programming instructions when executed by the processor 802. The I/O ports 820 are one or more serial and/or parallel communication ports that provide communication between additional peripheral devices, which may be coupled to the hardware system 800.

The hardware system 800 may include a variety of system architectures. Further, various components of the hardware system 800 may be rearranged. For example, the cache 804 may be on-chip with the processor 802. Alternatively, the cache 804 and the processor 802 may be packed together as a "processor module," with processor 802 being referred to as the "processor core." Furthermore, certain implementations of the present invention may not require or include all of the above components. For example, the peripheral devices shown coupled to the standard I/O bus 808 may couple to the high performance I/O bus 806. In addition, in some implementations, only a single bus may exist, with the components of the hardware system 800 being coupled to the single bus. Further, the hardware system 800 may include additional components such as additional processors, storage devices or memories. As discussed below in one embodiment, the operations of an online trading system including the system 100 described herein are implemented as a series of software routines run by the hardware system 800. These software routines comprise a plurality or series of instructions to be executed by a processor in a hardware system such as the processor 802. Initially, the series of instructions are stored in a storage device such as the mass storage 818. However, the series of instructions can be stored in any suitable storage medium such as a diskette, CD-ROM, ROM, EEPROM, etc. Furthermore, the series of instructions need not be stored locally and could be received from a remote storage device such as a server on a network via the network/communication interface 816. The instructions are copied from the storage device such as the mass storage 818 into the memory 814 and then accessed and executed by the processor 802.

An operating system manages and controls the operation of the hardware system 800, including the input and output of data to and from software applications (not shown). The operating system provides an interface between the software applications being executed on the system and the hardware components of the system. According to one embodiment of the present invention, the operating system is the Windows® 95/98/NT/XP operating system, available from Microsoft Corporation of Redmond, Wash. However, the present invention may be used with any other suitable operating systems such as the Apple Macintosh Operating System, which is available from Apple Computer Inc. of Cupertino, Calif., UNIX operating systems, LINUX operating systems and the like.

Advantageously, the present invention provides a method and system for providing content according to personal preference. Further, while the present invention has been shown and described with respect to a preferred embodiment, those skilled in the art will recognize that various changes and modifications may be made without departing from the spirit and scope of the present invention as defined in the appended claims.

What is claimed is:

1. A method of providing a personalized content in a content providing server, comprising:
   receiving, from a client, a content request identifying a content category;
   identifying the client associated with the content request;
   identifying the content category from the content request;
   determining if the content category is included in a preference tag associated with the identified client, wherein the preference tag comprises a plurality of hierarchical category identifiers selected from a hierarchical configuration of category identifiers; and
   in response to the content category being included in the preference tag associated with the identified client, providing personalized content in accordance with the preference tag of the identified client, and
   in response to there being no preference tag associated with the identified client, providing the personalized content in accordance with preference tags of other clients, using collaborative filtering,
   wherein providing the personalized content in accordance with the preference tag of the identified client comprises providing the personalized content in accordance with the preference tag that is included in the content category of the identified client using a preference score of the preference tag, wherein the preference score of the preference tag depends on a frequency of client accesses to content objects with the preference tag and on category weight as a function of type of event and tag level of the preference tag, and wherein the personalized content associated with the preference tag and a personalized content associated with a different preference tag of the identified client are provided to the identified client according to a ratio of the preference scores of the preference tags.

2. The method of claim 1, wherein the step of providing the personalized content in accordance with the preference tag that is included in the content category of the identified client further comprises the step of selecting at least one preference tag among the preference tags that include the content category based on the respective preference score.

3. The method of claim 1, wherein the step of providing the personalized content in accordance with the preference tag that is included in the content category of the identified client further comprises the step of controlling the amount of personalized content in accordance with the preference score of the preference tag.

4. The method of claim 1, wherein the step of providing the personalized content in accordance with the preference tag that is included in the content category of the identified client includes the step of providing the personalized content in accordance with the preference tag having the same tag level.

5. The method of claim 1, further comprising the step of updating the preference tag and the respective preference score.

6. A system for providing content to clients comprising:
   one or more processors;
   volatile storage and persistent storage;
   a content storage module for storing content;
   a client profile storage module for storing preference tags for each client; and
   a control module for, in response to a content category received from the client being associated with a preference tag, providing personalized content in accordance with a preference tag that includes the content category, and in response to a content category received from the client not being associated with a preference tag, providing the personalized content in accordance with preference tags of other clients, using collaborative filtering;
   a client content consumption history storage module for storing a history of content objects having a corresponding preference tag that a client has accessed; and
   a client preference calculating module for calculating a preference score for each preference tag, wherein the preference score depends on a frequency of client accesses to content objects with the preference tag and on category weight as a function of type of event and tag level of the preference tag, and wherein the personalized content associated with the preference tag and a personalized content associated with a different preference tag of the client are provided to the client according to a ratio of the preference scores of the preference tags.

7. The system according to claim 6, further comprising a tag setting module for setting a tag to a content object that is stored in the content storage module.

8. The system according to claim 6, further comprising a means for performing collaborative filtering.

9. A non-transitory computer-readable medium encoded with executable instructions, operable when executed to cause one or more processors to:
   receive, from a client, a content request identifying a content category;
   identify the client associated with the content request;
   identify the content category from the content request;
   determine if the content category is included in a preference tag associated with the identified client, wherein the preference tag comprises a plurality of hierarchical category identifiers selected from a hierarchical configuration of category identifiers; and
   in response to the content category being included in the preference tag associated with the identified client, provide personalized content in accordance with the preference tag of the identified client, and in response to there being no preference tag associated with the identified client, provide the personalized content in accordance with preference tags of other clients, using collaborative filtering, wherein providing the personalized content in accordance with the preference tag of the identified client comprises providing the personalized content in accordance with the preference tag that is included in the content category of the identified client using a preference score of the preference tag, wherein the preference score of the preference tag depends on a frequency of client accesses to content objects with the preference tag and on category weight as a function of type of event and tag level of the preference tag, and wherein the personalized content associated with the preference tag and a personalized content associated with a different preference tag of the identified client are provided to the identified client according to a ratio of the preference scores of the preference tags.

10. The non-transitory computer-readable medium of claim 9, wherein the step of provide the personalized content in accordance with the preference tag that is included in the content category of the identified client further comprises the logic causing the one or more processors to select at least one preference tag among the preference tags that include the content category based on the respective preference score.

11. The non-transitory computer-readable medium of claim 9, wherein the step of provide the personalized content in accordance with the preference tag that is included in the content category of the identified client further comprises the logic causing the one or more processors to control the amount of personalized content in accordance with the preference score of the preference tag.

12. The non-transitory computer-readable medium of claim 9, wherein the step of provide the personalized content in accordance with the preference tag that is included in the content category of the identified client includes the logic causing the one or more processors to provide the personalized content in accordance with the preference tag having the same tag level.

13. The non-transitory computer-readable medium of claim 9, further comprising the logic causing the one or more processors to update the preference tag and the respective preference score.

* * * * *